Jan. 25, 1966     N. D. SHERMAN     3,231,691

CONTACT MECHANISM FOR TIMERS AND THE LIKE

Filed Nov. 2, 1961     12 Sheets-Sheet 1

INVENTOR
Nelson D. Sherman

BY *Strauch, Nolan & Yeale*

ATTORNEYS

Jan. 25, 1966   N. D. SHERMAN   3,231,691
CONTACT MECHANISM FOR TIMERS AND THE LIKE
Filed Nov. 2, 1961   12 Sheets-Sheet 4

INVENTOR
Nelson D. Sherman

BY Strauch, Nolan & Neale
ATTORNEYS

INVENTOR
Nelson D. Sherman

Jan. 25, 1966   N. D. SHERMAN   3,231,691
CONTACT MECHANISM FOR TIMERS AND THE LIKE
Filed Nov. 2, 1961   12 Sheets-Sheet 6

INVENTOR
Nelson D. Sherman

BY Strauch, Nolan & Neale
ATTORNEYS

Jan. 25, 1966     N. D. SHERMAN     3,231,691
CONTACT MECHANISM FOR TIMERS AND THE LIKE
Filed Nov. 2, 1961     12 Sheets-Sheet 9

INVENTOR
Nelson D. Sherman
BY Strauch, Nolan + Neale
ATTORNEYS

Jan. 25, 1966   N. D. SHERMAN   3,231,691
CONTACT MECHANISM FOR TIMERS AND THE LIKE
Filed Nov. 2, 1961   12 Sheets-Sheet 10
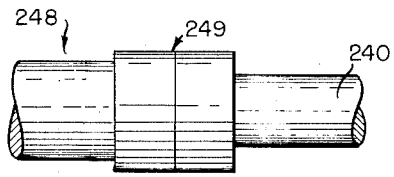
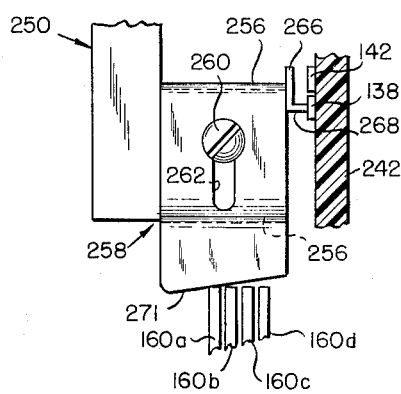
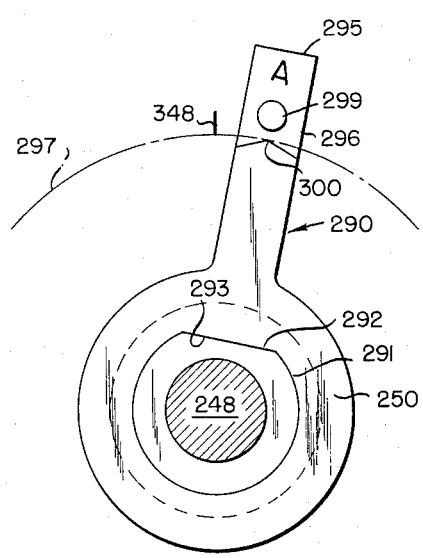
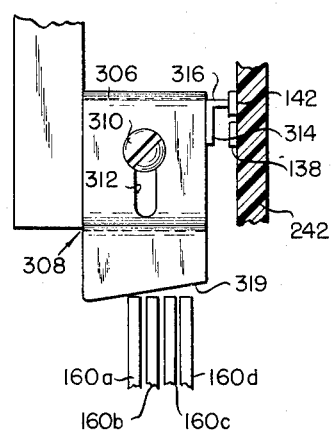
INVENTOR
Nelson D. Sherman
BY  *Strauch, Nolan & Yeale*
ATTORNEYS

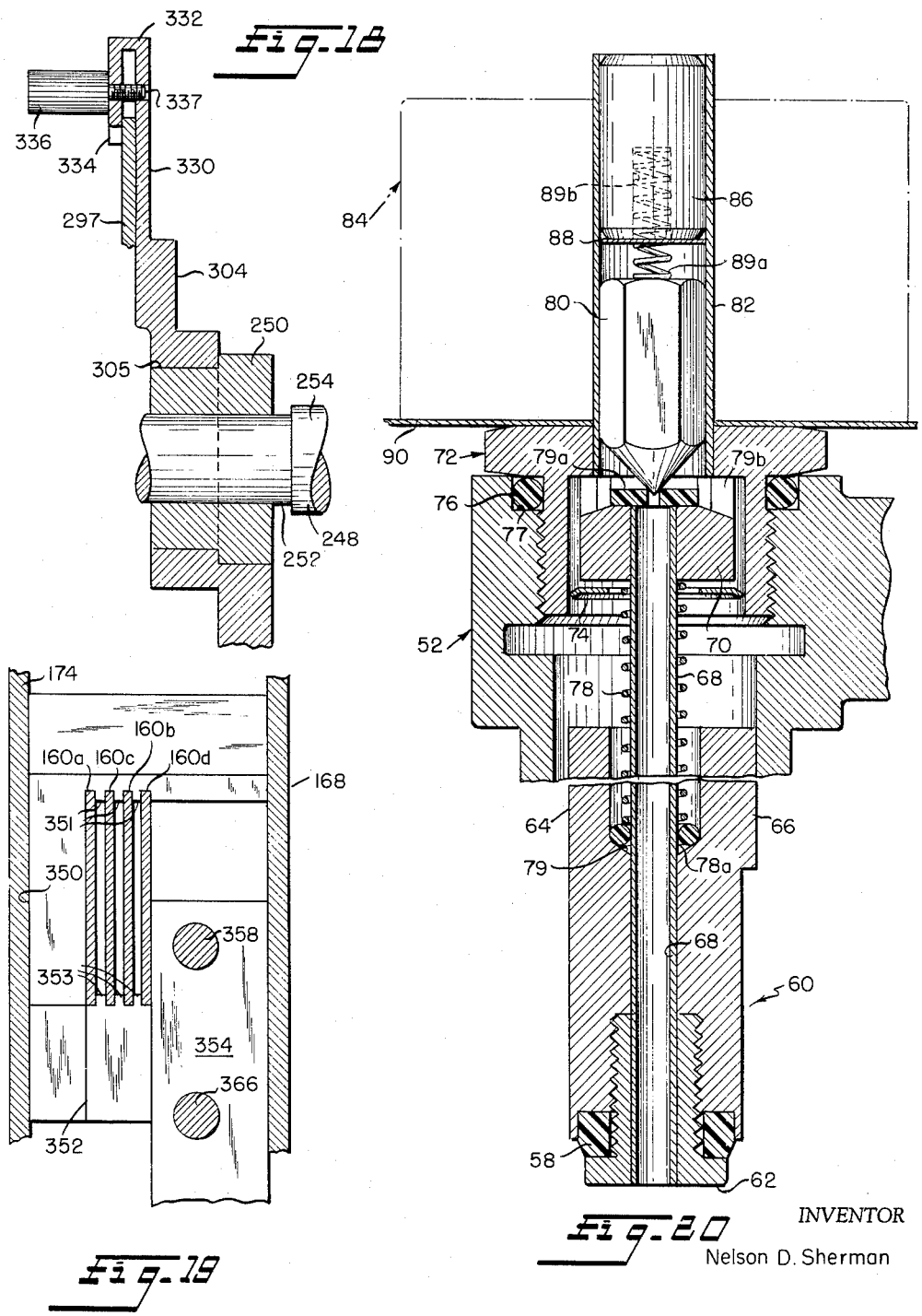

Jan. 25, 1966   N. D. SHERMAN   3,231,691
CONTACT MECHANISM FOR TIMERS AND THE LIKE
Filed Nov. 2, 1961   12 Sheets-Sheet 12

INVENTOR
Nelson D. Sherman

BY Strauch, Nolan & Neale
ATTORNEYS

United States Patent Office 3,231,691
Patented Jan. 25, 1966

3,231,691
CONTACT MECHANISM FOR TIMERS
AND THE LIKE
Nelson D. Sherman, San Diego, Calif., assignor to Straza
Industries, El Cajon, Calif., a corporation of California
Filed Nov. 2, 1961, Ser. No. 149,551
7 Claims. (Cl. 200—24)

This invention relates to timer mechanism and, in particular, to timer mechanism for sequentially activating a series of separate load circuits for selectively variable intervals after a selectively variable interval prior to activation of the first load circuit. This timing mechanism is particularly applicable to a lawn sprinkling system though it is to be understood that it is by no means limited to this particular application.

The typical, permanently installed, lawn sprinkling system comprises a plurality of water distribution system branches located in the various areas of a lawn. In the conventional systems, water is supplied through a solenoid valve to all of these water distribution system branches at the same time. The result is ineffective watering of the lawn because sufficient water pressure is generally not available to maintain the required pressure in all of the branches at the same time.

Accordingly, a primary object of this invention resides in the provision of novel timing mechanism for successively activating a plurality of load circuits, the loads being, in one typical application, solenoid-operated valves controlling the flow of water to water distribution system branches in a lawn sprinkling system.

Normally, it is desirable to water the several lawn areas for varying lengths of time. For example, areas under trees may require substantially more water than other areas. It is a further object of this invention, therefore, to provide timing mechanisms which can activate plural load circuits for selectively variable intervals of different durations.

It is often desirable to begin watering at a particular time of day. However, the home owner is not always at home at the particular time at which it is desired the watering begin. Hence, it is a further object of this invention to provide a timing mechanism which can be set to automatically activate the first of a plurality of load circuits after a selectively variable time interval.

It is common, and even mandatory in many areas of the country, to water only on selected days of the week. A further primary object of this invention, then, resides in the provision of a timing mechanism which can sequentially control a series of separate load circuits for selectively variable intervals together with a plurality of selectively operable switches which, when moved to the off position, prevent the timing mechanism from actuating the load circuits during a period of predetermined duration. In a lawn sprinkling system, there may be seven such switches, one for each day of the week, and the period of predetermined duration may be one day.

It is desirable, in some instances, to repeat the watering cycle during a particular day. Accordingly, it is a further primary object of this invention to provide a novel timing apparatus including a selectively activated, alternate timing mechanism also for sequentially controlling a series of separate load circuits for selectively variable intervals after a selectively variable interval prior to activation of the first load circuit.

Further novel features and other objects of this invention will became apparent from the following detailed description, discussion, and the appended claims taken in conjunction with the accompanying drawings showing a preferred structure and embodiment in which:

FIGURE 14 is a detailed illustration of a somewhat different type of shaft coupling employed in the timer;

FIGURE 15 illustrates in detail a contact employed in the timer;

FIGURE 16 is a detailed illustration of a handle employed in the timer and is, in effect, taken along line 16—16 of FIGURE 6;

FIGURE 17 is a detailed illustration of a modified type of contact employed in the timer;

FIGURE 18 is a detailed illustration of a somewhat modified type of handle employed in the timer;

FIGURE 19 is an end view of the contact slides and the guide in which they are mounted, and is taken substantially along line 19—19 of FIGURE 3;

FIGURE 20 is a vertical sectional view through a solenoid valve employed in the solenoid valve assembly;

FIGURE 23 is a schematic illustration of the manner in which the contact slides are positioned.

Figure 1:
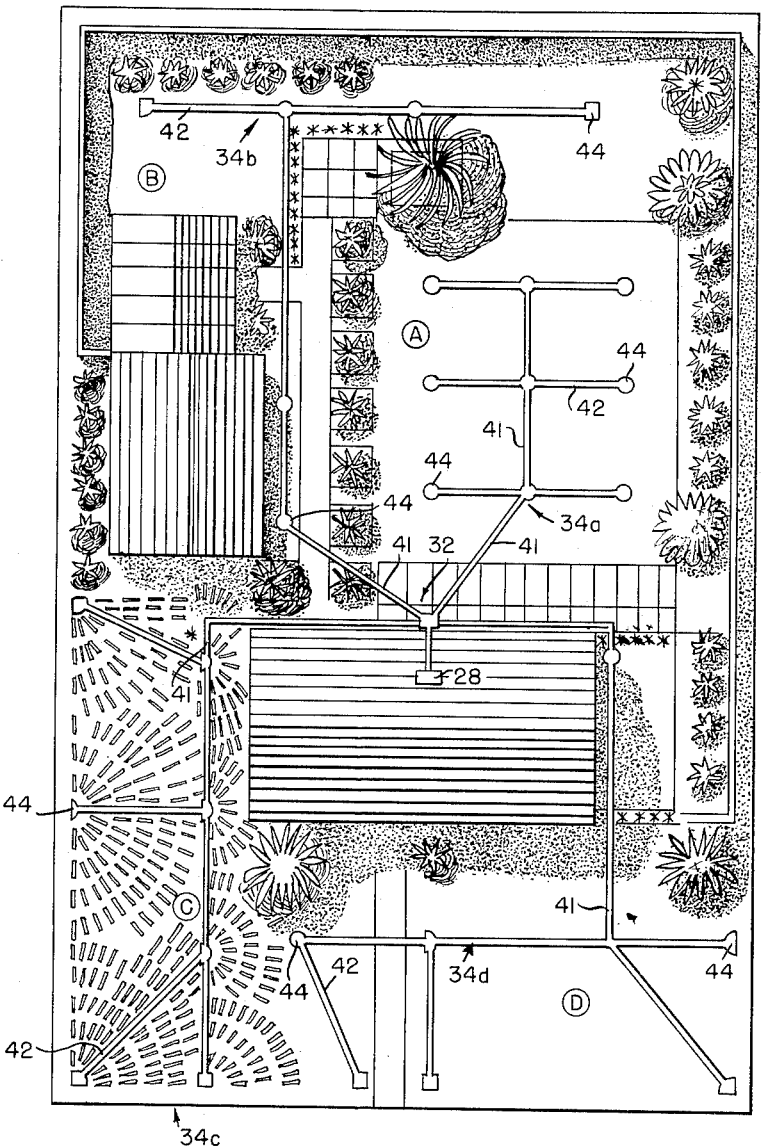
FIGURE 1 is a plan view of a lawn having a permanently installed sprinkler system controlled by a timer-operated solenoid valve assembly constructed in accordance with the principles of the present invention.

Referring now to the drawings, FIGURE 1 illustrates a lawn sprinkling system employing a timer 28 in accordance with the present invention to control the flow of water through a solenoid valve assembly 32 to branches 34a–d of a water distribution system, these branches being located, respectively, in lawn areas A, B, C, and D. Each of the distribution system branches 34a–d comprises a supply pipe 41 connected by pipes 42 to a plurality of sprinkler heads 44.

Valve assembly 32 (FIGURE 8) includes four valves 48 (only one of which is shown) which cooperate with annular, upwardly directed valve seats 50 formed in valve assembly body 52 to control the flow of water from inlet 54 to outlets 56 to which supply pipes 41 are coupled.

Figure 8:
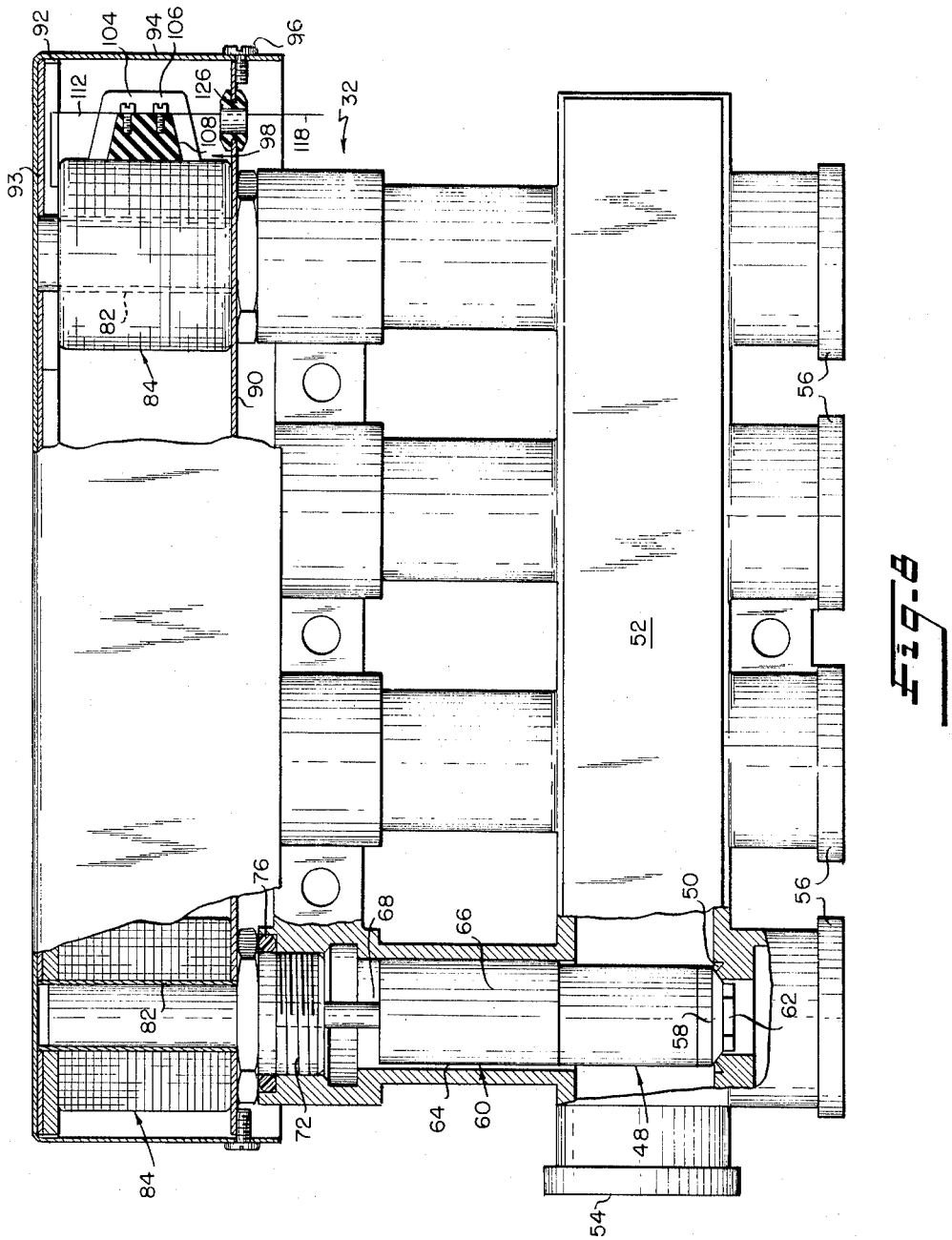
FIGURE 8 is a side elevational view, partly in section, of a solenoid valve assembly constructed in accord with the principle of the present invention.

As is shown in FIGURES 8 and 20, each of the four identical valves 48 comprises a valving member such as a neoprene washer 58 secured to a piston 60 by a hollow, threaded, enlarged head fastener 62. Each piston 60 is slidably mounted in valve assembly body 52 with a flat surface 64, extending the length of enlarged diameter piston portion 66, allowing water to pass from inlet 54 to the top of piston 60 to bias valve member 58 into engagement with valve seat 50.

Piston 60 slides up and down on a centrally disposed tube 68 press fitted, at its upper end, to retainer 70 which is retained within a depending cylindrical portion of a hollow nut 72 by a spring fastener 74. Nut 72 is threaded into the upper end of valve assembly body 52 with an O-ring 76 mounted on the depending cylindrical portion thereof engaging the horizontal and vertical surfaces of an annular notch 77 in the upper end of valve assembly body 52 to prevent leakage. A compression spring 78 extends downwardly from the bottom surface of nut 72 and biases a second O-ring 78a disposed around tube 68 against a conical seat 79 located interiorly of the piston.

A neoprene washer 79a disposed in an annular recess 79b of retainer 70 in vertically spaced relationship to the upper end of tube 68 forms a valve seat for a pilot valve 80. Pilot valve 80, the body of which is of hexagonal cross-section, is slidably mounted in a tube 82 soldered or brazed at its lower end to hollow nut 72 and comprises the armature of a solenoid 84. A plug 86 soldered or brazed into the upper end of tube 82 seals the upper end of the tube and limits the upward travel of pilot valve 80. A non-magnetic washer 88 disposed within tube 82 adjacent the lower end of plug 86 insures that residual magnetism in plug 86 will not keep pilot valve 80 in its upper position after the flow of current to solenoid 84 is cut off. Spring 89a, which is attached to the upper end of pilot valve 80 and extends upwardly through washer 88 into a cylindrical recess 89b in plug 86, biases the pilot valve into engagement with its seat 79.

Solenoids 84a–d are mounted on a horizontally disposed plate 90 attached to the top of hollow nuts 72 with tubes 82 extending upwardly through appropriate holes in the plate. A longitudinally extending spacer 92, slidingly received over the upper ends of tubes 82, is disposed adjacent the upper ends of solenoids 84a–d in peripheral engagement with a U-shaped channel 93 and a hollow, downwardly open cover 94 (see also FIGURE 21) which is fastened in place over solenoids 84a–d adjacent the upper ends of tubes 82 by screws 96 abutting the lower surface of plate 90.

Figure 21:
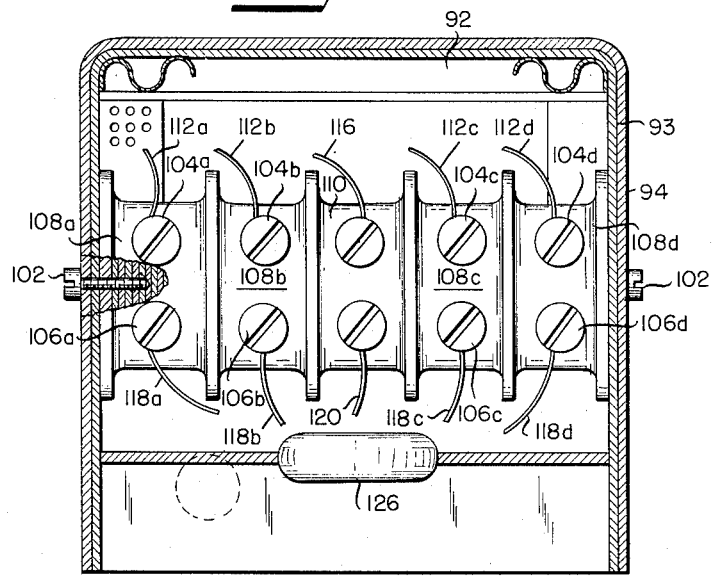
FIGURE 21 is a vertical sectional view through the solenoid assembly.
Figure 22:
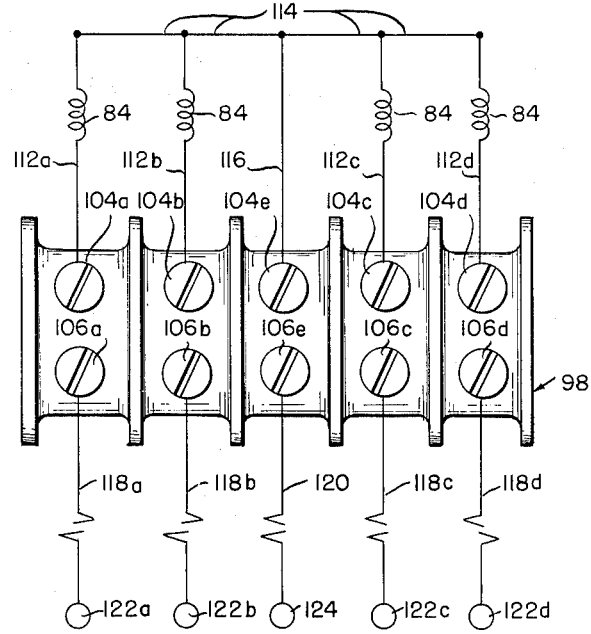
FIGURE 22 is a wiring diagram of the solenoid assembly.

A segmented barrier strip 98, shown in FIGURES 8, 21, and 22, is fixedly mounted between the depending legs of the U-shaped channel 93 by screws 102 which extend through cover 94 and channel 93 into threaded engagement with the barrier strip. A pair of terminals 104 and 106 are threaded into each of the barrier strip segments 108a–d. Terminals 104a–d are connected by leads 112a–d to the winding of solenoids 84a–d. Leads 114 connect solenoids 84a–d to a return lead 116 which is connected to contact 104e in segment 110. Contacts 106a–d in segments 108a–d are connected by leads 118a–d to timer terminals 122a–d and contact 106 in segment 110 is connected by lead 120 to timer terminal 124. Leads 118a–d and 120 extend through an aperture in plate 90 within which is disposed a friction-reducing and insulating washer 126.

Referring now to FIGURES 8 and 20, each of the valves 48, all of which are identical, operates as follows:

Water entering valve assembly 32 under pressure through inlet 54 flows upwardly to the top of piston 60 between casing 52 and flat piston surface 64. The pressure of this water acting on the top of piston 60 moves it downward until valve member 58 engages valve seat 50. When a solenoid 84 is activated by timer 28, the valve 80, which forms the armature of solenoid 84, is drawn upwardly from its seat 79 into the core of the solenoid, allowing the water which was exerting pressure on the top of piston 60 to flow into the upper end of tube 68. This water then flows downwardly through tube 68 and out outlet 56, relieving the pressure on the top of piston 60.

The water pressure acting upwardly on the horizontal surfaces of piston 60 is, at this point, greater than the pressure acting downwardly on its top. The differential pressure moves piston 60 upward, raising valve 58 from its seat and allowing water to flow from inlet 54 through valve seat 50 and out outlet 56 into supply pipe 41. Pilot valve 80 will remain in the open position until the current to solenoid 84 is cut off. Then it will drop, by gravity and light spring pressure, into engagement with its seat 79. Since the water flowing in through inlet 54 and upward between casing 52 and flat piston surface 64 can no longer escape through pipe 68 at this point, it will again exert pressure on the top of piston 60, moving it downward and forcing valve 58 into engagement with seat 50, thus cutting off the flow of water from inlet 54 to outlet 56.

Figure 7:
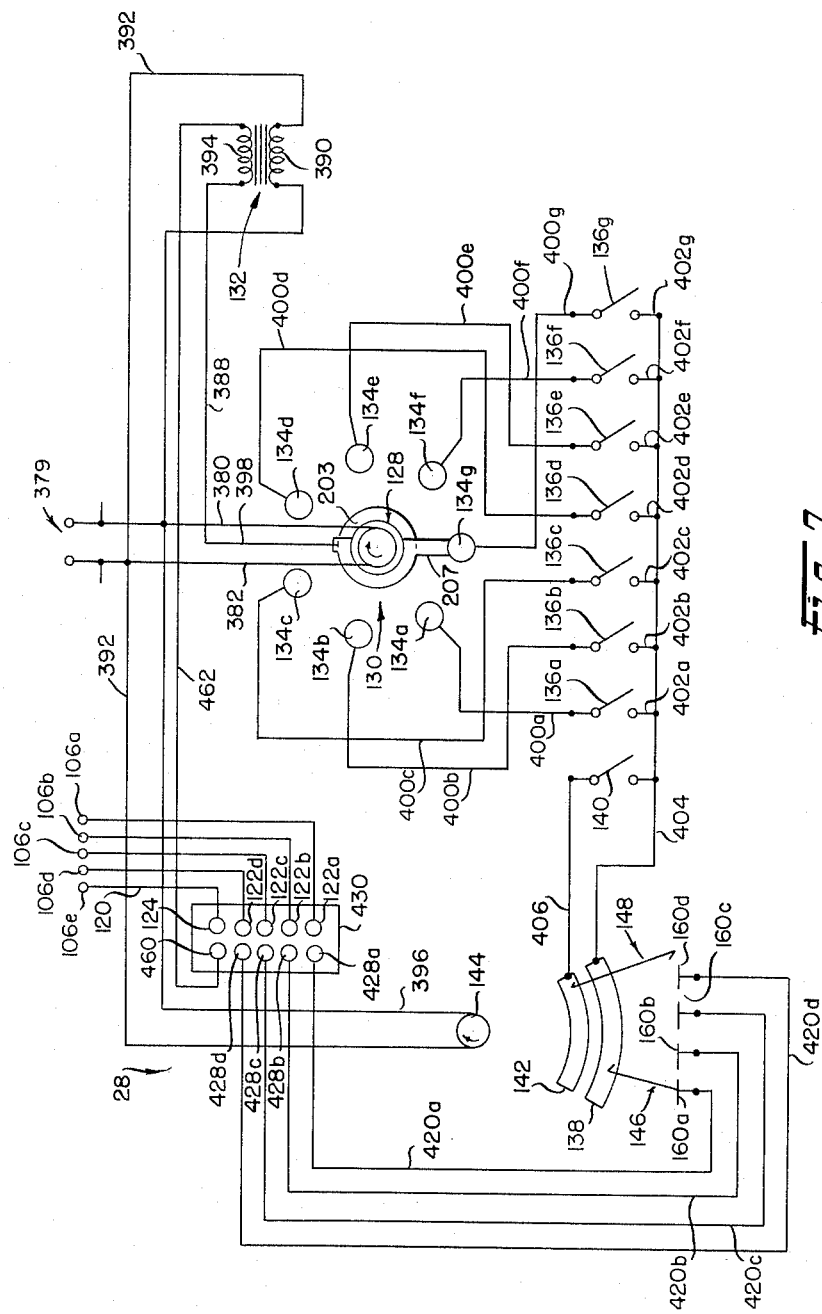
FIGURE 7 is a schematic wiring diagram of the timer.

Looking now to FIGURE 7, timer 28 includes, in general, a synchronous motor 128 having an output shaft which revolves ⅐ of a revolution per day and drives a contact arm 130 that completes a circuit from transformer 132 to, successively, each of the seven contacts 134a–g. Each of the contacts 134a–g is, therefore, engaged by brush 130 for a twenty-four hour period during one of the seven days of the week. Contacts 134a–g are connected through associated switches 136a–g to a contact segment 138 and through a further switch 140 to a second contact segment 142. Thus, by opening the appropriate switch 136a–g, the circuits to contact segments 138 and 142 are interrupted during the days that contact arm 130 is in contact with the contacts 134a–g connected to the open switches. As a result, solenoids 84a–d will not be activated on those days and the lawn will not be watered.

Figure 2:
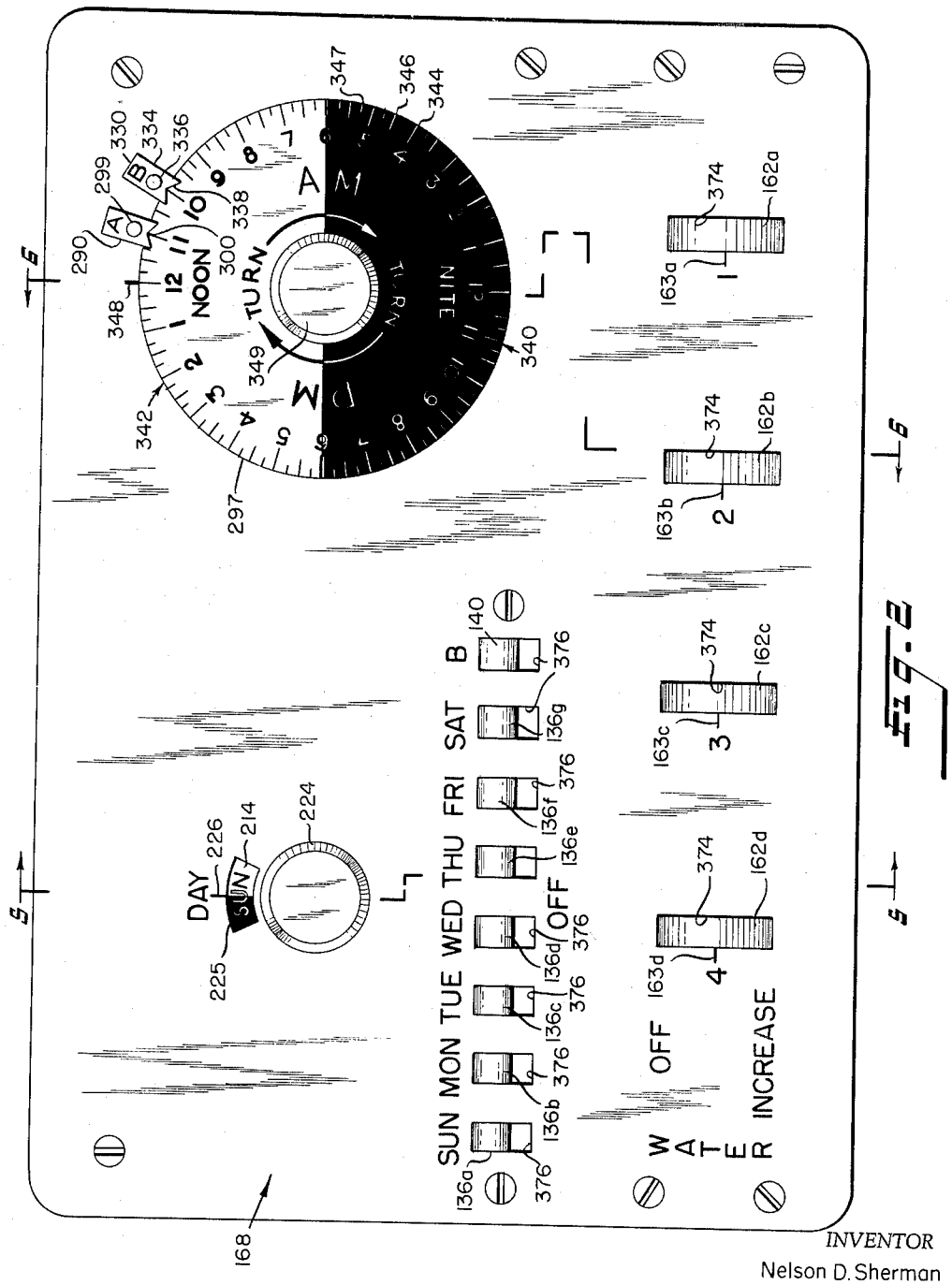
FIGURE 2 is a front elevation of the timer.

On the other hand, if during the period contact arm 130 is in contact with contact 134a, for example, switches 136a and 140 are closed, parallel circuits will be completed to contact segments 138 and 142. Then successive circuits will be completed from segments 138 and 142 to solenoids 84a–d during this period as follows: A second synchronous motor 144 has an output which revolves once every 24 hours and drives contact arm or brush assemblies 146 and 148. These brush assemblies are arranged to complete circuits from, respectively, contact segments 138 and 142 to, successively, contact slides 160a–d (which are connected through terminals 122a–d to solenoids 84a–d) to activate the valving members 48 to the open position so that the lawn will be watered. Rotation of dials 162a–d (see FIGURE 2) adjusts the relative position of contact slides 160a–d and thereby, in a manner which will later be explained in detail, determines the length of time that contact arm assemblies 146 and 148 will remain in engagement with the contact slides and, therefore, the length of the periods for which solenoids 84a–d will maintain valves 48 open. The length of these periods determines the amount of water delivered to each lawn area.

Figure 9:
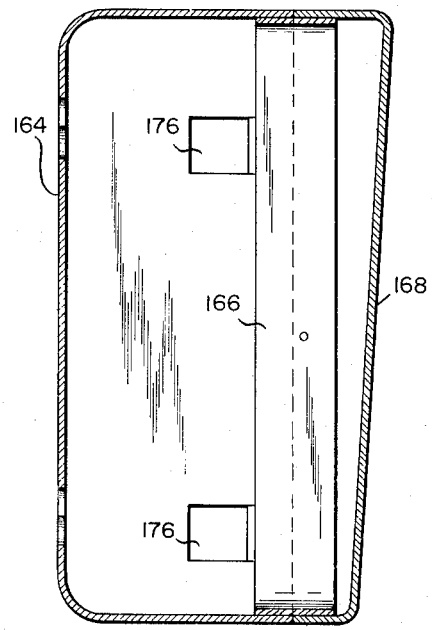
FIGURE 9 is a sectional elevation of a casing in which the timer may be mounted.

The timer mechanism is contained in a hollow, forwardly open casing 164 (best shown in FIGURES 5 and 9) in which is mounted a guide element 166 extending continuously around the inner periphery of the cover and beyond the forwardly open end thereof. A cover 168, which slidingly engages the outer side of guide element 166 and abuts the edge of casing 164, is secured in place by a plurality of screws 170 (only one being shown) which extend from the exterior of cover 168 through apertures (not shown) therein into threaded engagement with tapped apertures 172 in guide element 166.

A vertically extending plate 174 mounted within and flush with the rear edge of guide element 166 abuts the inwardly extending legs of L-shaped brackets 176 (not all of which are shown). Brackets 176 are rigidly attached to casing 164 in any suitable manner.

It may in some instances be desirable to flush mount timer 28 within a wall or like structure. In this case, casing 164 is not employed, plate 174 being attached directly to the mounting structure by screws or other suitable fastening means.

Figure 5:
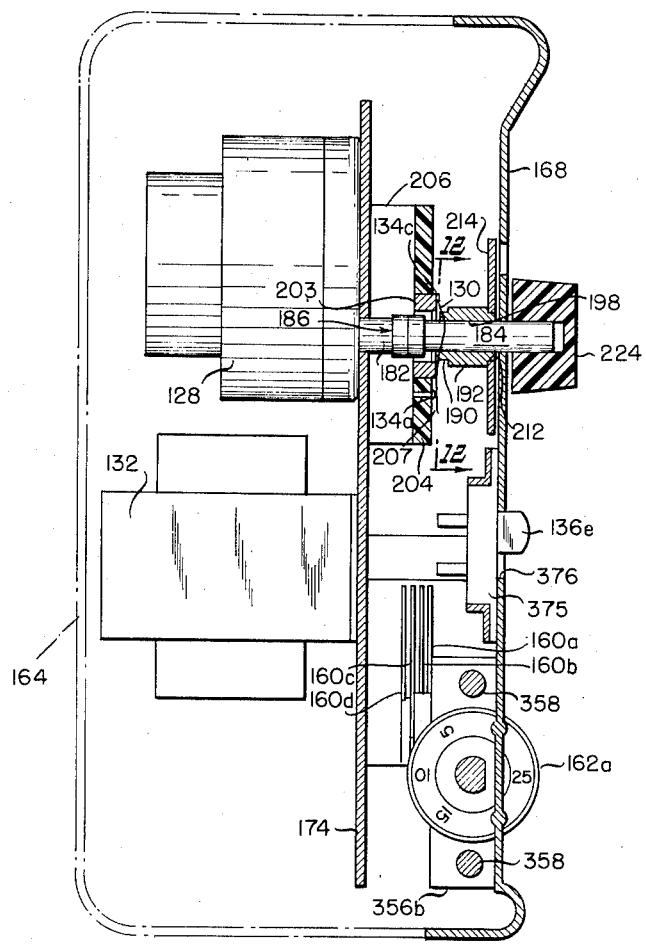
FIGURE 5 is a section of the timer taken substantially along line 5—5 of FIGURE 2.
Figure 11:
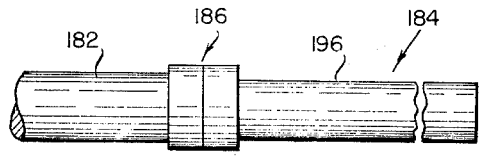
FIGURE 11 is a detailed illustration of a shaft coupling employed in the timer.
Figure 12:
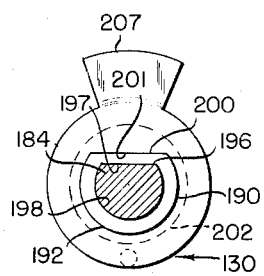
FIGURE 12 is a detailed illustration of a contact arm employed in the timer and is taken substantially along line 12—12 of FIGURE 5 except that the contact arm has been rotated 180°.

Synchronous motor 128 which, it will be remembered, establishes the successive circuits to the seven contacts 134a–g representing the seven days of the week, is mounted on plate 174 with its output shaft 182 extending forwardly through an aperture in the plate. As shown in FIGURES 5, 11 and 12, a forwardly extending shaft 184 is operatively connected to motor output shaft 182 by a friction clutch 186 which allows one of these shafts to be rotated relative to the other by the person setting the timer.

A reduced diameter end portion 190 (FIGURE 5) of a sleeve 192 non-rotatably mounts the electrically conductive contact arm 130. Sleeve 192 is non-rotatably and slidably mounted upon shaft 184 by the engagement of flat shaft surface 196 (FIGURE 12) on shaft 184 with a corresponding surface 197 in bore 198 of sleeve 192. Extended flat surface 200 on end portion 190 of sleeve 192 cooperates with a similar internal surface 201 on contact arm 130 to fix it to the sleeve 192.

Sleeve 192 extends forwardly and is dimensioned to bias a peripheral annular portion 202 (FIGURE 12) of contact arm 130 into engagement with an electrically conductive ring 203 (FIGURE 5). Ring 203 is fixedly mounted in an aperture in a commutator block 204 attached by integral leg portions 206 (only one of which is shown) to plate 174. Sleeve 192, additionally, biases an integral arm portion 207 (FIGURE 12) of contact arm 130 into engagement with the equidistantly circumferentially spaced contacts 134a–g (see also FIGURE 7) corresponding to the days of the week which are mounted on the forward side of commutator block 204.

Figure 13:
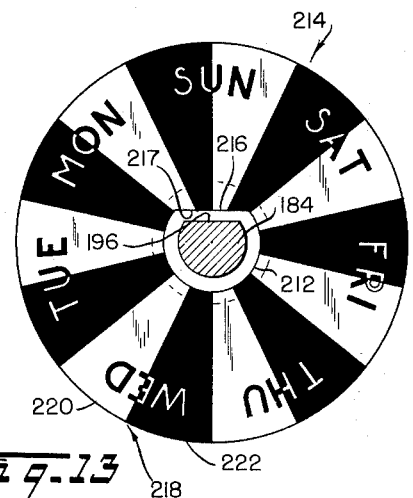
FIGURE 13 illustrates a dial employed in the timer.

On a forward, reduced diameter end portion 212 sleeve 192 non-rotatably mounts a dial 214 (see FIGURE 13), milled external surface 216 on reduced diameter end portion 212 cooperating with a similar internal surface 217 on dial 214 to rotatively fix these elements. The face of dial 214 is divided into seven equal segments 218, each lettered with one of the days of the week. Each of the segments 218 is further equally divided into a light-colored area 220 and a dark-colored area 222.

A knob 224 (FIGURE 5) is non-rotatably mounted on the outermost end of shaft 184 in any convenient manner. An arcuate slot 225 is provided in cover 168 (see FIGURE 2) opposite the lettering on dial 214 and an index 226 is located immediately above the slot. By rotating knob 224, the segment 218 lettered with the present day of the week may be made to appear in slot 225. This positions the contact arm 130 on the contact 134a–g corresponding to that day. By positioning the light-colored area 220 or the dark-colored area 222, as appropriate, with respect to index 226, the operator may position contact arm 130 so that it will disengage from the corresponding contact 134a–g at the end of the day.

Looking next to FIGURES 6 and 14–19, synchronous motor 144, which rotates contact arm assemblies 146 and 148 once every day to complete circuits from the operative day contact 134a–g through arcuate contact segments 138 and 142 (providing switch 140 and the appropriate day switch 136a–g is closed) to, in succession, solenoids 84a–d, is mounted on plate 174. Its output shaft 240 extends forwardly through an aperture in plate 174 and a corresponding, axially aligned aperture in insulating pad 242. As is shown in FIGURE 14, a forwardly extending shaft 248 is operatively connected to motor output shaft 240 by a friction clutch 249 which allows one of these shafts to be rotated relative to the other when the timer is set.

Figure 3:
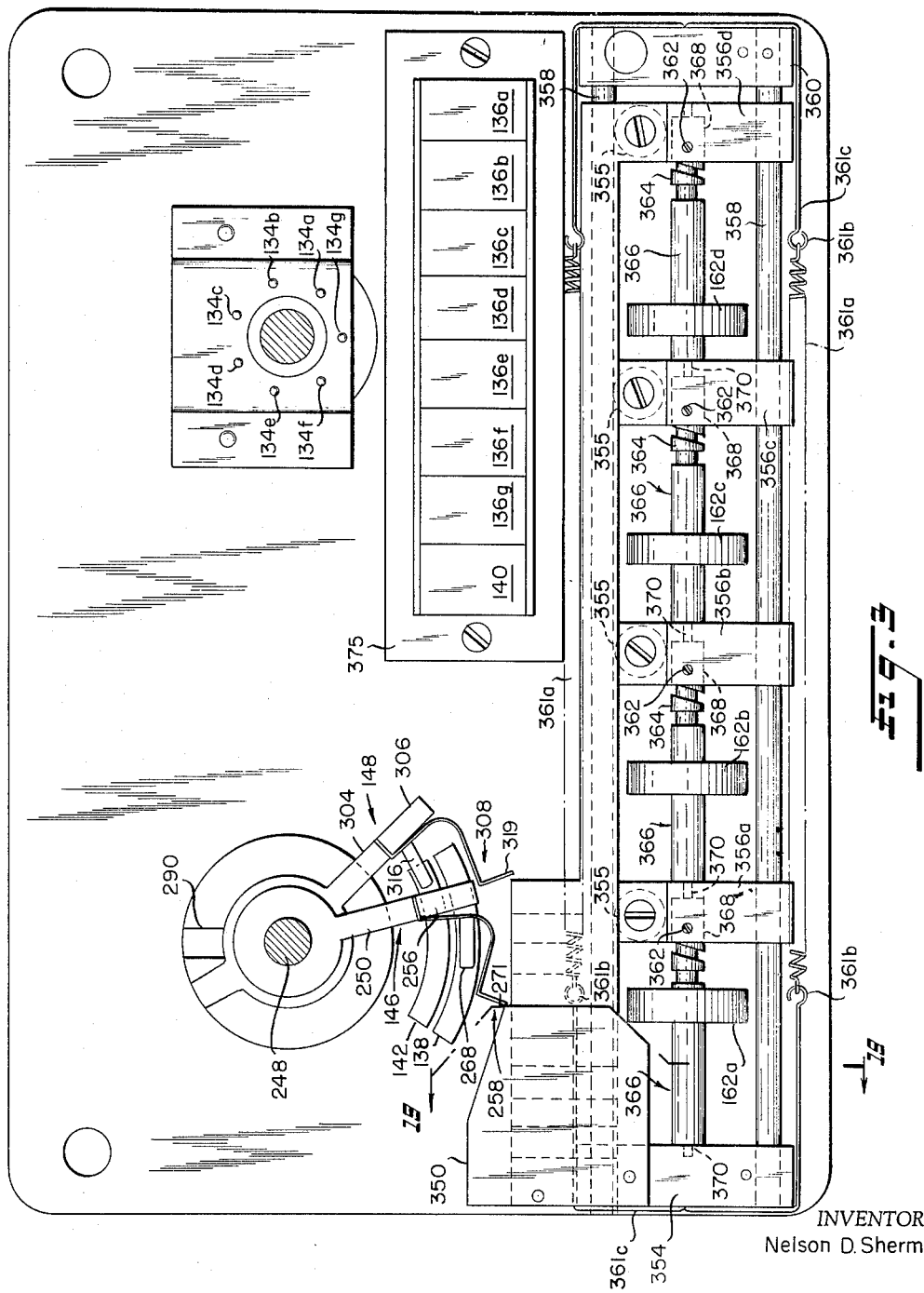
FIGURE 3 is a view of the timer taken substantially along line 3—3 of FIGURE 6.

Contact arm assembly 146 comprises an elongated contact arm 250 (FIGURE 6) rotatably mounted on a reduced diameter portion 252 of shaft 248 in spaced relationship to the forward side of an enlarged diameter shaft portion 254. Contact arm 250 terminates, at its lower end, in a rearwardly extending mounting portion 256 (FIGURES 3 and 15). A contact 258 is adjustably mounted upon rearwardly extending, contact arm mounting portion 256 by a screw 260 extending through an elongated slot 262 into threaded engagement with the rearwardly extending portion 256. Contact 258 is bent, at its upper end, to a position overlying the upper surface of rearwardly extending contact portion 256. A laterally bent contact portion 266 terminates, at its lower end, in a horizontally bent, integral portion 268 adapted to slidingly engage the arcuate contact segment 138 which is attached to insulating pad 242. At its lower end, contact 258 terminates in an upwardly and rearwardly beveled portion 271 adapted to successively engage contact slides 160a–d. Thus, it will be seen that, as motor 144 rotates contact arm assembly 146 through its one revolution per day cycle, contact 258 establishes electrical continuity between contact segment 138 and, successively, contact slides 160a–d.

Figure 6:
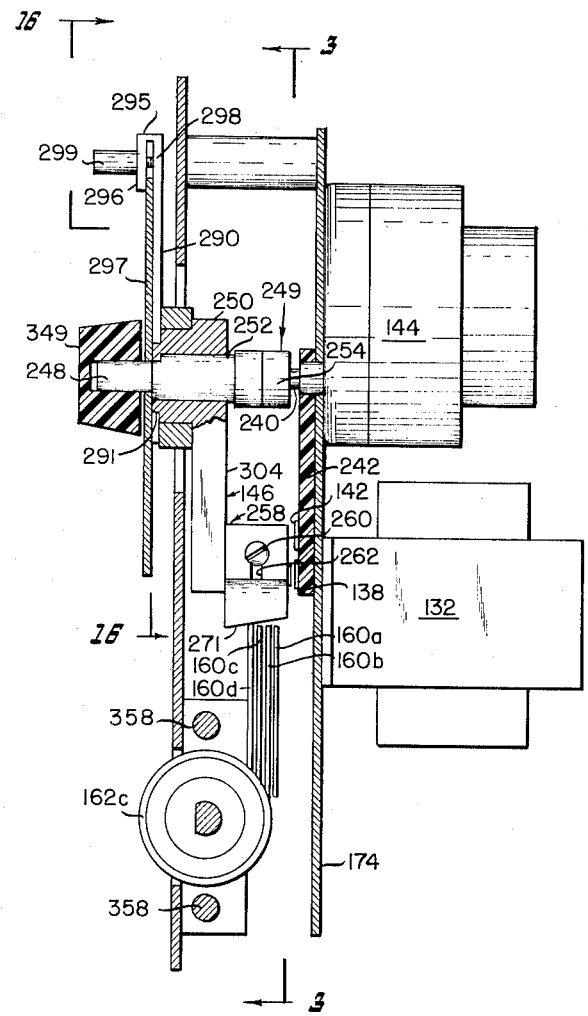
FIGURE 6 is a section of the timer taken substantially along line 6—6 of FIGURE 2.

A vertically extending handle 290 is provided so that the operator may position beveled edge 271 of contact 258 with respect to the first-contacted edge of contact slide 160a. Since contact 258 is rotated at a uniform speed by motor 144, such positioning, in effect, determines the time of day at which contact 258 engages contact segment 138 and contact slide 160a. This, it will be apparent, determines the time at which solenoid 84a will be opened to begin the watering cycle. Handle 290 (FIGURE 16) is non-rotatably mounted on forwardly extending, reduced diameter portion 291 of contact arm 250 by the cooperation of a milled surface 292 on the contact arm and a corresponding milled surface 293 on handle 290. At its upper end, handle 290 terminates in an integral, forwardly bent portion 295 (FIGURES 6 and 16) and an integral downwardly bent portion 296 which slidingly engages a peripheral portion of a "Day" dial 297 non-rotatably fixed on shaft 248 (FIGURE 6). A threaded extension 298 of a clamping knob or screw 299 extends through an aperture in downwardly extending handle portion 296 and into threaded engagement with an axially aligned, threaded aperture in the upwardly extending portion of handle 290. The apex of a downwardly oven V-shaped notch 300 (FIGURE 16) at the lower end of downwardly extending portion 296 provides an indicator operatively associated with the face of "Day" dial 297.

The face of dial 297 (FIGURE 2) is equally divided into a light area 340 labeled "NOON" and a dark area 342 labeled "NITE." The juncture of areas 340 and 342 on the right side of the dial is labeled "A.M." and the corresponding juncture on the left side of the dial is labeled "P.M." The elongated peripheral hour indices 344 on the periphery of dial 297 are numbered from 1 to 12, beginning in the center of the areas 340 and 342 and proceeding counterclockwise. A somewhat shorter half-hour index 346 is located between adjacent hour indices 344 and a quarter-hour index 347 is located between adjacent half-hour indices 346. A reference index 348 is located on cover 168 opposite indices 344, 346 and 347. Dial 297 may be rotated by a knob 349 non-rotatably fixed to the outer end of shaft 248 in any convenient manner.

Dial 297 is, in effect, a clock face. To set this clock, dial 297 is rotated by knob 349 until the proper index 344, 346 or 347 appears opposite the index mark 348. Then handle 290 may be rotated until V-notch 300 appears opposite the time of day at which it is desired the watering cycle begin. By tightening clamping knob 299, handle 290 and the contact arm assembly 146 carrying contact 258 are rotatively fixed on dial 297 and, therefore, to motor shaft 248. By setting handle 290 to a later time of day, contact 258 is moved further away from the leading edge of contact slide 160a and it will, therefore, be longer before it reaches the contact slide.

Contact arm assembly 148 comprises a contact arm 304 rotatably mounted on contact arm 250 and journalled upon a reduced diameter portion 305 thereof. Contact arm 304 is similar to, and functions in the same manner as, contact arm 250 except that it carries a contact which is effective to complete the alternate circuit through brush 142 to contact slides 160a–d to provide the second watering period. At its lower end, contact arm 304 terminates in a rearwardly extending, mounting portion 306 (see FIGURE 3). Mounted upon rearwardly extending portion 306 is a spring contact 308 which is physically and functionally similar to the contact 258 mounted upon contact arm 250 which was just described.

Spring contact 308 is mounted for slidable vertical adjustment (see FIGURE 17) by a screw 310 extending through a vertically elongated slot 312 into threaded engagement with contact arm mounting portion 306 and is bent at its upper end to a position overlying the upper surface thereof. A laterally bent portion 314 of contact 308 terminates at its upper end in a horizontally extending, rearwardly bent portion 316 which is adapted to maintain sliding contact with arcuate contact segment 142. Contact segment 142 is fixedly attached to insulating pad 242 which separates contact segments 138 and 142 from metal plate 174. At its lower end, contact 308 terminates in an upwardly and rearwardly beveled portion 319 which is adapted to successively engage contact slides 160a–d in the same manner as does beveled edge portion 271 of contact 258.

The opposite end of contact arm 304 (see FIGURE 18) terminates in an upwardly extending handle 330 juxtaposed to the rear face of dial 297. Handle 330 is constructed in substantially the same manner as handle 290 and is provided for the same purpose. At the upper end of handle 330, a forwardly extending, integral portion 332 terminates in an integral portion 334 extending downwardly over the peripheral portion of dial 297. A clamping screw 336 has a threaded extension 337 which extends through a horizontal aperture in downwardly extending portion 334 into threaded engagement with an axially aligned, threaded aperture in the upwardly extending portion of handle 330. Thus, handle 330 may be moved relative to, and then rotatively fixed to, dial 297 in the same manner and with the same result as handle 290.

The apex of a downwardly opened, V-shaped notch 338 (FIGURE 3) at the lower end of downwardly extending handle portion 334 provides an indicator identical to indicator 300, and like the latter, enables the operator to accurately position handle 330 with respect to dial 297 to set the time of day at which the watering cycle will begin, the watering cycle in this case being the cycle providing the second daily watering period.

Figure 4:
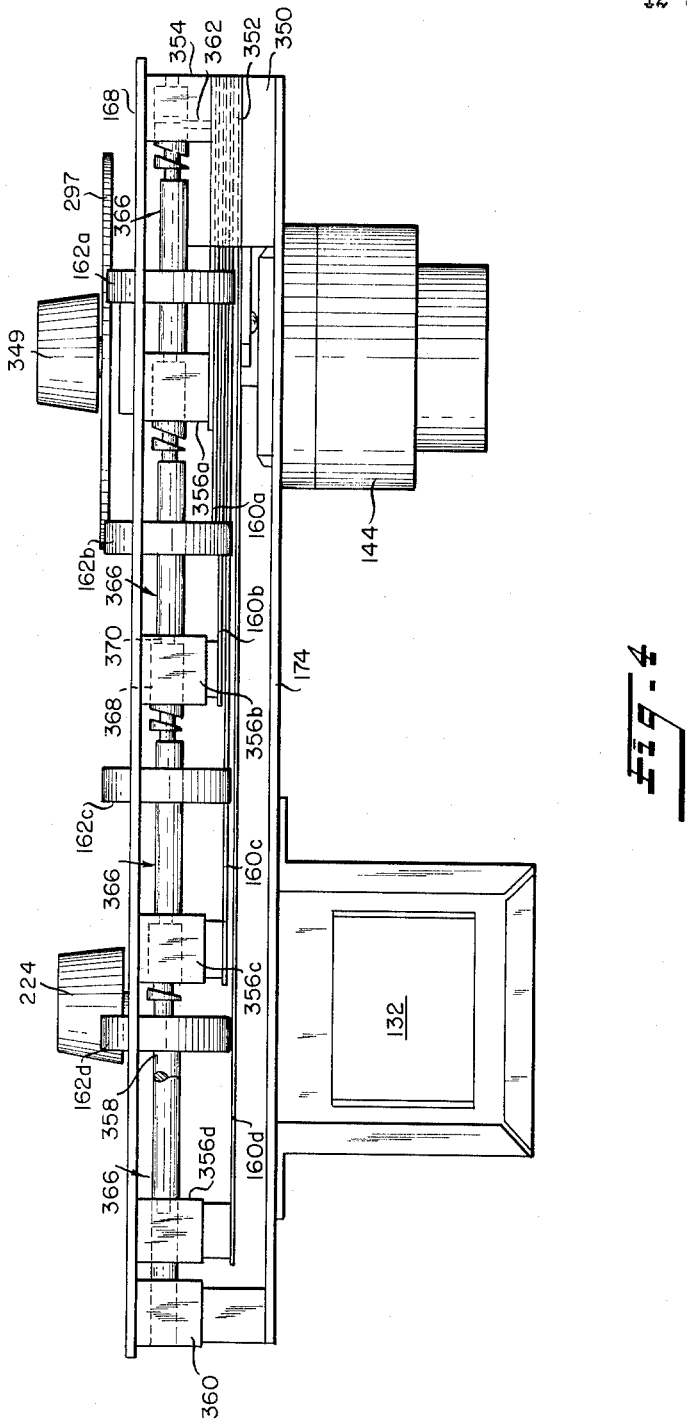
FIGURE 4 is a bottom view of the timer.

Referring next to FIGURES 3, 4 and 19, contact slides 160a–d which, as was indicated above, are successively contacted by contact 258 and 308 to complete successive circuits to solenoids 84a–d, are, at one end, axially slidably mounted between an upper guide 350 and a lower guide 352. Contact slides 160a–d are laterally spaced apart by depending upper guide fingers 351 and upwardly extending lower guide fingers 353. Upper guide 350 is rigidly mounted on the forward side of plate 174 and lower guide 352 is attached to a guide rod positioning block 354 which is mounted on front cover 168. Contact slides 160a–d are attached, at their opposite ends, by screws 355, to slide blocks 356a–d which are slidably disposed upon a pair of horizontally extending, vertically spaced apart guide rods 358 (see FIGURE 6). The guide rods 358 are rigidly attached at their respective ends to guide rod positioning blocks 354 and 360. Guide block 360, like guide block 354, is rigidly mounted on front cover 168. To further strengthen this structure U-shaped spring clips 361 are disposed in surrounding relationship over guide blocks 354 and 360 and connected together by springs 361a hooked in eyes 361b formed in the ends of brackets 361c. A set screw 362 extends through a vertical side wall of each of the guide blocks 356 and into motion transmitting relationship with square cut screw threads 364 of an adjusting screw 366. Screws 366 extend between adjacent guide blocks 356 and, at their opposite ends, into laterally drilled holes 368 and 370 in guide blocks 354, 356 and 360.

Slidably mounted upon guide screws 366 are the rotatably fixed knobs 162 which extend through slots 374 in front cover 68. The face of each knob is numbered from 5 to 30 in increments of 5, the numbers being equidistantly spaced about the periphery of the dial (see FIGURE 5). Cooperating reference indices 163a–d are oppositely located on cover 68. By rotating knobs 162a–d, guide screws 366 are made to operate through set screws 362 to shift contact slides 160a–d. By shifting contact slides 160a–d the watering period in each of the lawn areas A–D may be varied since such shifting varies the length of the period for which the contacts 258 and 308 will engage the contact slides and, therefore, the length of the period for which solenoid valves 84a–d will remain open.

Switches 136a–g and 140 are mounted upon a bracket 375 and extend forwardly through slots 376 in front cover 168 to which the bracket is attached. As was pointed out above, if switch 136a, for example, is opened, the circuit to contact segments 138 and 142 will be interrupted during the twenty-four hour period contact arm 130 is in engagement with contact 134a. The watering cycle, then, will not take place during that period. All of the switches 134a–g function in the same manner.

FIGURE 7 is a partially schematic wiring diagram of timer 28. A 110-volt power source 379 is connected to the synchronous, one revolution per week motor 128 by leads 380 and 382; to the synchronous, one revolution per day motor 144 by a circuit comprising leads 382, 392, 396 and 380; and to the high voltage side of transformer 132 by a circuit comprising leads 380, 388, primary winding 390, and leads 392 and 382.

Secondary winding 394 of transformer 132 is connected to ring 203 by lead 398. Contact arm 130, which is in continuous sliding engagement with ring 203, completes a circuit from it to, in succession, day of the week contacts 134a–g. Leads 400a–g complete the circuits from contacts 134a–g to switches 136a–g which are connected, in parallel, by leads 402a–g, to a lead 404 connected to arcuate contact segment 138. Arcuate contact segment 142 is connected in parallel (through switch 140) to arcuate segment 138 by a lead 406.

Contact 258 connects arcuate segment 138 to, successively, contact slides 160a–d (see FIGURE 15). Similarly, contact 308 connects arcuate segment 142 to, successively, contact slides 160a–d (see FIGURE 16) Leads 420a–d connect contact slides 160a–d to terminals 428a–d on terminal block 430. As was pointed out above, output terminals 122a–d are connected through leads 118a–d to solenoids 84a–d in solenoid valve assembly 32. Solenoids 84a–d are connected through a common return lead 120 to terminal 124. Terminal 460 and lead 462 connect terminal 124 to secondary 394 of transformer 132. It is to be understood that terminal block 430 is constructed in the conventional manner to establish continuity between terminals 122a and 428a, 122b and 428b, 122c and 428c, 122d and 428d, and 124 and 460.

Figure 10:
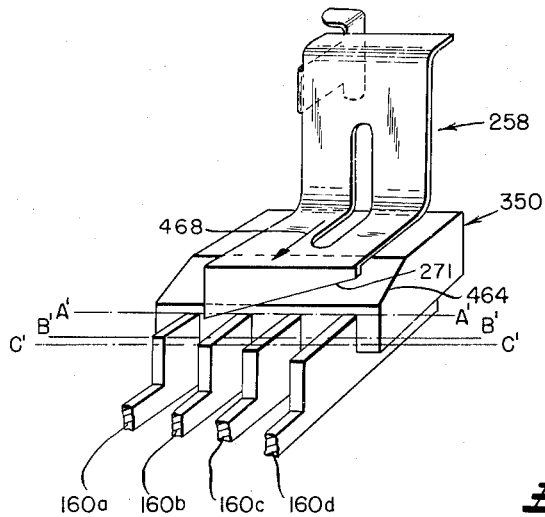
FIGURE 10 is a perspective view of the contact and contact slides employed in the timer.

The manner in which spring contacts 258 and 308 engage contact slides 160a–d may be seen in FIGURE 10 (only spring contact 258 is illustrated, but the operation of spring contact 308 is identical). Spring contact 258, rotated at the speed of one revolution per day in a clockwise direction by contact arm 250, moves from right to left in sliding engagement across a downwardly beveled surface 464 of top guide 350; it is biased downwardly by the spring-forming configuration of the contact into engagement with contact slide 160a, the point at which this occurs being represented by line A'—A'. Contact portion 271 slides across the upper edge of contact slide 160a until it reaches its left-hand edge, whereupon it drops off the end of contact slide 160a and is biased down by its spring-forming configuration into engagement with contact slide 160b, the point at which contact portion 271 engages contact slide 160b being indicated by line B'—B'. Contact portion 271 then slides from right to left across the top edge of contact slide 160b until it reaches the left-hand end thereof at which point (designated by line C'—C') it is biased down into engagement with contact slide 160c. Contact 258 proceeds clockwise in this manner until it travels beyond the left-hand edge of contact slide 160d. It should be noted, at this point, that because of the upwardly and rearwardly beveled configuration of contact depending portion 271, contact 258 can engage only one contact slide at a time and, therefore, the circuits through contact slides a–d are completed successively. This is an important aspect of the present invention. Because only one of the contact slides is engaged by contact 258 at any given time, it follows necessarily that only one of the solenoid valves 84a–d is open at any one time since each of these solenoids is connected to the correspondingly lettered contact slide 160a–d only. As a result, only one of the valves 48 is open at any given time and full water pressure is supplied in turn to each of the water distribution branches 34a–d. The arrangement described above has a second important aspect. This is that the contacts 258 and 308 are, because of their spring-like qualities, sharply disengaged from the contact slides 160a–d when they reach the respective ends of these slides. This action is effective to prevent arcing between the contacts and the contact slides.

Timer 28, described in detail above, is set for operation as follows: First, the operator sets "Day" dial 297 to the exact time of day by rotating knob 349 until the appropriate index on dial 297 is aligned with reference index 348 on cover 168. The effect of this operation is to angularly displace shaft 184 with respect to output shaft 182 of synchronous motor 128 which, it will be remembered, rotates one revolution per day. Next the operator rotates knob 224 until the present day of the week appears in slot 225 in cover 168, approximating the present hour of the day by appropriately positioning light area 220 or dark area 222 of the colored segment associated with the proper day of the week with respect to index 226 on cover 168. The effect of this operation is to rotate contact arm 130 into contact with the appropriate contact 134a–g.

Next, handle 290 is rotated until V-notch 300 is opposite the index 344, 346, or 347 corresponding to the time of day at which it is desired sprinkling of the lawn will begin. Clamping knob 299 is then tightened to rotatively fix handle 290 (and thus contact arm assembly 146) to dial 297 and to shaft 248 to which the dial is, in turn, rotatively fixed. By rotating handle 290, the operator angularly displaces contact arm assembly 146 about the axis of reduced diameter portion 252 of shaft 248, thereby setting contact arm assembly 146 a distance from the end of contact slide 160a which it will first contact corresponding to the delay that it is desired ensue before the watering cycle begin.

If a second watering period is desired, contact arm assembly 148 is positioned in the same manner as was contact arm assembly 146; i.e., handle 330 is rotated until the apex of V-shaped notch 338 is opposite the time of day at which it is desired that the second watering cycle begin. Clamping screw 336 is then tightened to rotatively fix contact arm assembly 148 to dial 397 and, therefore, to shaft 248. The operator must, also, close switch 140 to complete the alternative circuit to arcuate contact segment 142.

The day or days of the week on which it is desired that the watering cycle occur are selected by moving the appropriate switch 136a–g to the upward or closed position. The length of watering time desired for each of the lawn areas A–D is then set as follows: first, dials 162a–d are rotated until the zero number on the face of the dial appears opposite the corresponding index 163a–d on cover 168. Then, dials 162a–d are, in order, rotated until the number designating the desired watering time appears opposite the corresponding index reference marks 163a–d.

As may be seen from FIGURE 23, the effect of rotating dials 162a–d to the zero setting is to align the edges of contact slides 160a–d with the edge of upper guide 350. This position is schematically illustrated by line A"—A". Subsequently, dial 162a is rotated until the desired watering time appears opposite the index. This extends all of the contact slides 160a–d to the line B"—B", the distance between lines A"—A" and B"—B" being indicative of the watering time desired in the area A.

Next, dial 162b is set to the desired watering time. This extends contact slides 160b–c to line C"—C", the distance between lines B"—B" and C"—C" being indicative of the length of the period during which water will be supplied to the distribution system branch in area B.

This operation is then repeated with dials 162c and 162d. Again, the distance between lines C"—C" and D"—D" represents the watering time for area C and the distance between lines D"—D" and E"—E" represents the watering time for area D.

As motor 128 rotates, contact arm 130 successively engages contacts 134a–g. If, when contact arm 130 engages a particular one of the contacts 134a–g, the corresponding switch 136a–g is closed, a circuit is completed to arcuate contact segment 138. And, if switch 140 is closed, a second circuit is completed from the contact 134 to arcuate contact segment 142.

Motor 144 rotates contact arm assembly 146 in a clockwise direction, contact 258 moving in the direction shown by arrow 468 in FIGURE 10 and slidingly engaging arcuate contact segment 138 and, successively, contact slides 160a–d. Since motor 144 rotates at a constant speed, the distance which each of the contact slides 160a–d extends beyond the next adjacent slide determines the amount of time that the associated solenoid valve circuit is activated. When contact arm 258 is slidingly engaged with contact slide 160a, for example, a circuit is completed through lead 420a, terminal 428a, terminal 122a, lead 118a, terminals 104a and 106a and lead 112a to solenoid 84a in solenoid valve assembly 32. Energization of solenoid 84a opens pilot valve 80a which relieves the pressure on the top of piston 60a. This opens main valve 58a and allows water to flow from inlet 54 through valve seat 50a and outlet 56a into supply line 41a and through the sprinkler heads 44 in area A. As contact 258 subsequently engages contact slides 160b–d, similar circuits are successively completed to solenoids 84b–d. Valves 58b–d open, in turn, and water flows, successively, to the sprinkler heads 44 in areas B–D.

When switch 140 is closed, contact arm assembly 148 operates in the same manner as contact arm assembly 146, completing circuits through arcuate contact segment 142 to solenoids 84a–d. This, in the manner described above, successively opens valves 58a–d and water flows, in turn, to lawn areas A–D.

It is to be understood that the novel timer provided by the present invention is not limited to use in lawn sprinkling systems, but that it is adapted to be used in any application where it is desired to successively actuate a plurality of load circuits.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A contact assembly for a timer or the like, comprising:
    (a) a plurality of normally stationary contact slide members having elongated contact surfaces which are uniformly spaced apart and included in a single plane;

(b) a contact arm mounted for pivotal movement about an axis which is spaced from the plane in which the contact surface lies and is in a plane which is normal to the axes of elongation of said contact surfaces;
(c) means for rotating said contact arm about said axis; and
(d) a contact member fixed to said contact arm, said contact member having a contact surface disposed in a plane intersecting the plane including said contact surfaces at an acute angle and along a line which is parallel to the axes of elongation of said contact surfaces.

2. The contact assembly of claim 1, together with means for moving said contact slide members along paths which are parallel to the axes of elongation of said contact surfaces.

3. The contact assembly of claim 2, wherein the means for moving said contact means comprise:
(a) a slide block fixed to each of said contact slides;
(b) means mounting each said slide block for movement solely in a rectilinear path;
(c) a rotatably mounted shaft having screw threads formed thereon extending into each said slide block;
(d) a member fixed to each slide block and extending into the threads of the shaft associated therewith; and
(e) means for independently rotating each said shaft.

4. The contact assembly of claim 1, wherein the means for rotating said contact arm comprises:
(a) a rotatable shaft fixed to said contact arm; and
(b) a constant speed electric motor drive-connected to said shaft.

5. A contact assembly for a timer or the like, comprising:
(a) a plurality of normally stationary contact slide members mounted in uniformly spaced apart, parallel relationship, said slide members having elongated contact surfaces included in a single plane and shoulders generally normal to said contact surfaces;
(b) a contact arm mounted for pivotal movement about an axis which extends across said contact surfaces and is spaced from the plane in which they are included; and
(c) a contact member having a first portion fixed to said contact arm and a second portion extending transversely across the contact surfaces of said slide members and terminating in an edge surface adapted to engage said contact surfaces, said surface being at an acute angle to the plane including said contact surfaces; and (d) means for rotating said contact arm about said axis.

6. The contact assembly of claim 5, wherein said contact member is fabricated of a resilient material and is so configured that the resiliency of said material biases the edge surface of said contact member against the contact surfaces of the slide members.

7. A contact assembly for a timer or the like, comprising:
(a) first and second guide members having parallel, uniformly spaced apart slots formed therein with the slots in the first guide opposite those in said second guide;
(b) a plurality of contact slide members mounted between and extending from said guides with the opposite edge portions of each slide received in grooves in said first and second guides, respectively;
(c) a contact arm mounted for pivotal movement about an axis which extends across said slide members and is spaced therefrom;
(d) a contact member having a first portion fixed to said contact arm and a second portion extending transversely across said slide members and terminating in an edge surface adapted to contact one of the edge surfaces of each of said slide members, said edge surface being included in a single plane and the edge surface of said contact member being disposed at an acute angle to said plane; and
(e) means for rotating said contact arm about said axis.

References Cited by the Examiner

UNITED STATES PATENTS

| | | | |
|---|---|---|---|
| 435,132 | 8/1890 | Battershall | 200—63 |
| 560,076 | 5/1896 | Bastos | 200—37 |
| 2,035,505 | 3/1936 | Petersen | 200—63 |
| 2,394,661 | 2/1946 | Brunner | 340—309 |
| 2,543,241 | 2/1951 | Johnson | 137—624 |
| 2,784,266 | 3/1957 | Krahulec | 200—25 |
| 2,851,099 | 9/1958 | Snoddy | 307—41 |
| 2,906,333 | 9/1959 | Ritgenthaler | 340—309 |
| 2,963,590 | 12/1960 | Schultz et al. | 307—41 |
| 2,967,546 | 1/1961 | Sisson | 137—624 |
| 3,055,994 | 9/1962 | Lundeen | 200—38 |
| 3,060,287 | 10/1962 | Koehler | 200—38 |

FOREIGN PATENTS 615,838 10/1926 France.

KATHLEEN H. CLAFFY, *Primary Examiner.*

ISADOR WEIL, LLOYD McCOLLUM, ROBERT K. SCHAEFER, *Examiners.*